United States Patent
Ethington et al.

(10) Patent No.: US 7,896,606 B2
(45) Date of Patent: Mar. 1, 2011

(54) SHEAR PLATE MOUNTING SYSTEM

(75) Inventors: Bradley Gayle Ethington, Rudd, IA (US); Shahid Qureshi, Garner, IA (US)

(73) Assignee: Oshkosh Corporation, Oshkosh, WI (US)

( * ) Notice: Subject to any disclaimer, the term of this patent is extended or adjusted under 35 U.S.C. 154(b) by 827 days.

(21) Appl. No.: 11/732,772

(22) Filed: Apr. 4, 2007

(65) Prior Publication Data

US 2007/0235403 A1   Oct. 11, 2007

Related U.S. Application Data

(60) Provisional application No. 60/789,407, filed on Apr. 5, 2006.

(51) Int. Cl.
*B60P 1/48* (2006.01)
(52) U.S. Cl. .................. 414/555; 212/180; 414/546
(58) Field of Classification Search .................. 212/180; 414/491, 546, 555
See application file for complete search history.

(56) References Cited

U.S. PATENT DOCUMENTS

| | | | | |
|---|---|---|---|---|
| 2,841,404 | A * | 7/1958 | Eitel ........................... | 182/2.11 |
| 3,023,913 | A * | 3/1962 | Talbert ......................... | 212/175 |
| 3,077,357 | A * | 2/1963 | Rugg ........................ | 280/438.1 |
| 3,533,515 | A * | 10/1970 | Milner, Jr. ................... | 212/288 |
| 3,580,611 | A * | 5/1971 | McNitt ......................... | 280/433 |
| 3,985,406 | A * | 10/1976 | Baron .......................... | 384/618 |
| 4,160,558 | A * | 7/1979 | Fritsch ......................... | 280/797 |
| 4,313,620 | A * | 2/1982 | Posnikoff ............. | 280/124.106 |
| 4,387,779 | A * | 6/1983 | Pisani .......................... | 180/9.5 |
| 4,397,396 | A * | 8/1983 | Kay et al. .................... | 212/303 |
| 4,458,772 | A * | 7/1984 | Oswald et al. ................ | 180/6.2 |
| 4,938,152 | A | 7/1990 | List | |
| 5,183,369 | A * | 2/1993 | Warren et al. ................ | 414/339 |
| 5,509,502 | A * | 4/1996 | Beaulieu ...................... | 187/242 |
| 5,815,999 | A | 10/1998 | Williams | |
| 5,902,048 | A | 5/1999 | Duggan | |
| 6,116,784 | A | 9/2000 | Brotz | |
| 6,189,930 | B1* | 2/2001 | Kalazny ...................... | 280/781 |
| 6,302,423 | B1* | 10/2001 | Alexander ............... | 280/415.1 |
| 6,585,286 | B2 | 7/2003 | Adema et al. | |
| 6,591,759 | B2 | 7/2003 | Bullock | |
| 6,883,967 | B2 | 4/2005 | Robb et al. | |

(Continued)

FOREIGN PATENT DOCUMENTS

DE            2752329  A  *  5/1979

(Continued)

*Primary Examiner*—Thomas J. Brahan
(74) *Attorney, Agent, or Firm*—Foley & Lardner LLP

(57) ABSTRACT

A crane mounting system to be used for mounting a crane onto a truck frame utilizes at least two shear plates with an L-shape profile. One part of each shear plate is interposed between a respective frame rail of the truck chassis and a respective end of a transverse mounting bar, while the orthogonal part of each shear plate is welded, at least partially, to the outer side of the respective frame rail. Interior holes on the transverse bars are threaded to accept inner tie down bolts while outer holes are drilled through to accept tie down studs. The shear plate acts as a wear plate/surface as the crane base sits on the transverse bars that in turn nests on the bent plate rather than directly on the chassis frame rail.

11 Claims, 4 Drawing Sheets

U.S. PATENT DOCUMENTS 6,960,024 B2    11/2005  Robb et al.
7,018,102 B1     3/2006  Brotz
7,047,695 B2     5/2006  Allen et al.
7,416,204 B2 *   8/2008  Hicks et al. .................. 280/433

FOREIGN PATENT DOCUMENTS

| | | | | |
|---|---|---|---|---|
| FR | 2 881 955 A | * | 1/2002 |
| JP | 03-216494 A | * | 9/1991 |
| JP | 2003-335496 A | * | 11/2003 |
| SU | 765468 A | * | 10/1978 |

* cited by examiner

SHEAR PLATE MOUNTING SYSTEM

CROSS-REFERENCE TO RELATED PATENT APPLICATIONS

This application claims priority from Provisional Application U.S. Application 60/789,407, filed Apr. 5, 2006, incorporated herein by reference in its entirety.

FIELD

The invention is directed to crane mounting systems. More particularly, to a shear plate crane mounting system used for mounting a crane onto a truck frame.

BACKGROUND

In a crane mounting system, the crane is typically mounted to be rotatable about at least one axis, typically about a vertical axis, and has an extendable boom, which may experience additional articulation. When the crane is being used for hoisting and swinging loads, the mounting frame experiences substantial torsional and lateral stress. Previous crane mounting systems for cranes adapted to be mounted on a truck frame typically utilize a frame of increased mass to enhance the resistance to torsional and lateral stress, the truck frame typically including rails. However, this solution limits the load-carrying capacity for the crane. Other previous developments utilize various gusset plates, cross braces, and shear plates which increase the truck frame resistance to the stress being experienced without adding greatly to the overall mass of the frame. A limitation to these developments is that they do not take into consideration the crane affixment, which experiences a substantial torsional and lateral stress.

Employing a clamp mounting does help, however, this type of mounting is subject to the positioning of mounting hardware elements and to improper tightening of them. When utilizing this type of mounting, the axial direction of mounting hardware elements must be strictly orthogonal to the top surface of the frame rails, the latter leading to increased requirements to alignment tolerance. In addition, the mounting hardware elements have to be tightened with a suitable force. Exceeding the proper tightening force, as well as deviation of the mounting hardware from an orthogonal position can lead to crushing of the frame rails.

Thus, there is a need for a mounting system capable of increased resistance to torsional and lateral stress.

There is also a need for a crane mounting system that is not subject to critical positioning of mounting hardware elements or to improper tightening of hardware elements.

There is also a need for a crane mounting system to be used for mounting an articulated crane onto a truck frame, wherein improvements pertain both to the crane affixment, and to the truck frame.

SUMMARY

There is provided method of mounting a base member of a crane on a vehicle support structure, the vehicle support structure including two parallel frame members. The method comprises coupling a wear plate to a surface of each frame member, wherein the section modulus of the each frame member is increased. Coupling an end of a first traverse mounting bar to each frame member. Coupling an end of a second traverse mounting bar to each frame member a predetermined distance from the first traverse mounting bar, wherein the first and second traverse bars are parallel to each other. Securing the base member of the crane to each of the first and second traverse mounting bars.

There is further provided a shear plate mounting system for mounting a crane, including a base member, to a vehicle support structure, with the vehicle support structure including two frame members with each frame member including an exterior side portion and an interior side portion. The shear plate mounting system comprises a pair of shear plates, with each shear plate coupled to one of the frame members. A pair of traverse mounting bars mounted atop each shear plate and coupled to each frame member. The mounting bars are positioned a spaced parallel distance from each other. A plurality of fasteners is configured to engage and secure the base member to each traverse mounting bar. The shear plates can be configured to increase the section modulus of each frame member.

There is further provided a vehicle comprising a vehicle support structure, including two frame members, with each frame member including an exterior side portion and an interior side portion. An engine is coupled to the support frame. A plurality of ground support members are coupled to the vehicle support structure, with at least two ground support members coupled to the engine and at least two ground support members steerable. A crane is coupled to the support structure with a shear plate mounting system which comprises a pair of shear plates, with each shear plate coupled to one of the frame members to increase the section modulus of each frame member. A pair of traverse mounting bars is coupled to each frame member and positioned a spaced parallel distance from each other. A plurality of fasteners is configured to engage and secure the base member to each traverse mounting bar.

BRIEF DESCRIPTION OF THE DRAWINGS

The accompanying drawings incorporated in and forming a part of the specification illustrate an exemplary embodiment and serves to explain the principles of the shear plate mounting system. In the drawings.

DETAILED DESCRIPTION OF THE PREFERRED EMBODIMENTS

Figure 1:
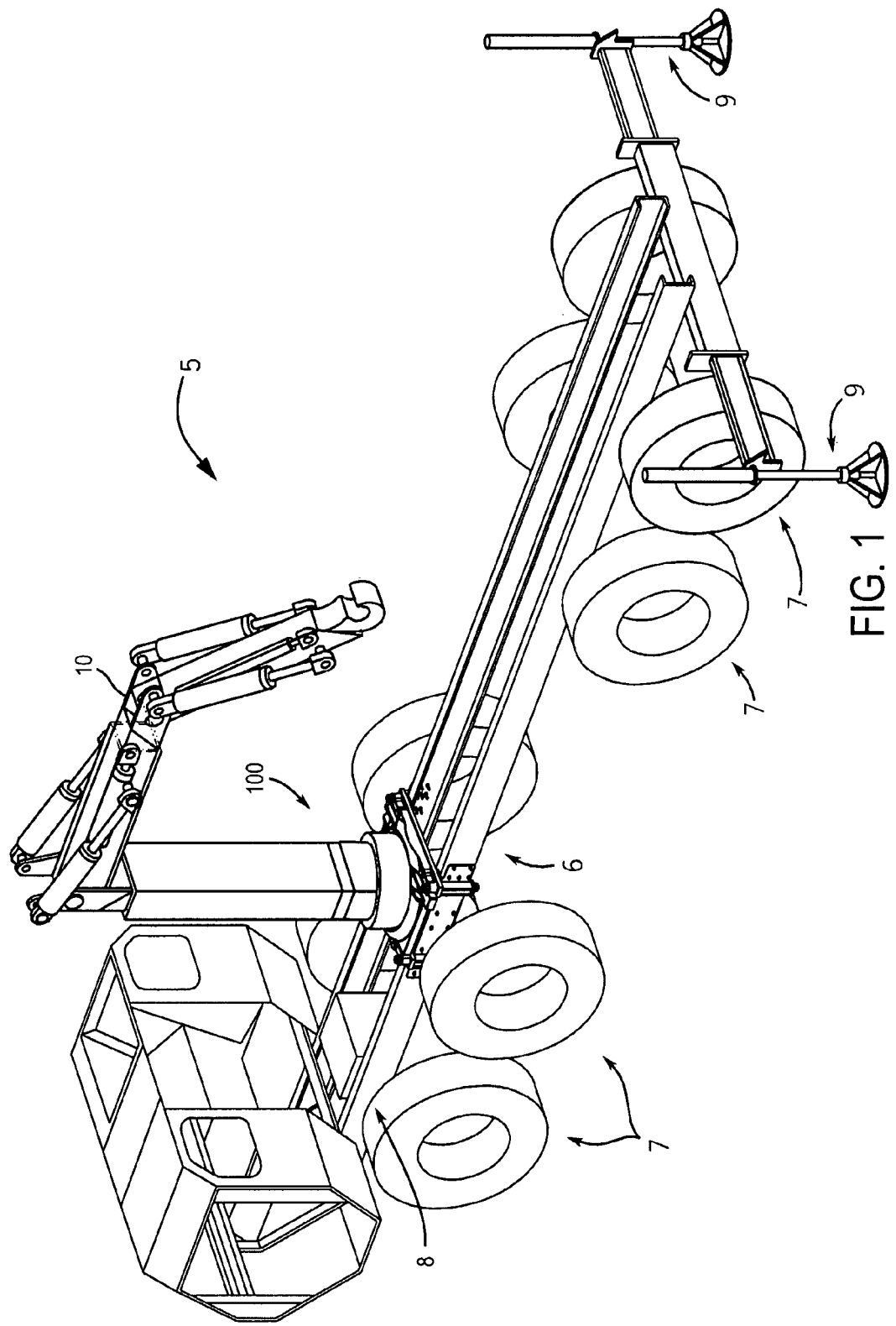
FIG. 1 is an isometric view of an exemplary embodiment of a vehicle including a crane mounting system according to an exemplary embodiment.

Referring to FIG. 1, there is shown a vehicle or truck 5 with an exemplary crane mounting system 100. The vehicle 5 includes a support structure or frame 6 to which are coupled a plurality of ground support members 7, an engine 8, and a crane 10. The vehicle may further include one or more support members 9. According to an exemplary embodiment, the ground support members 7 are wheels. The ground support members 7 can also be tracks (not shown) coupled to wheels and the engine 8. At least two of the ground support members 7 are coupled two an engine 8 and at least two of the ground support members 7 are steerable. The engine 8 can be a fuel cell, a gas turbine, an internal combustion engine, with the preferred embodiment being a diesel engine. The engine 8 can also be coupled to an electric generator which is coupled to a motor controller, and electric motors which in turn are coupled to the wheels 7. The support members 9 are configured to extend downward from the frame 6 and provide additional support for the vehicle 5 when the crane 10 is in use.

Figure 2:
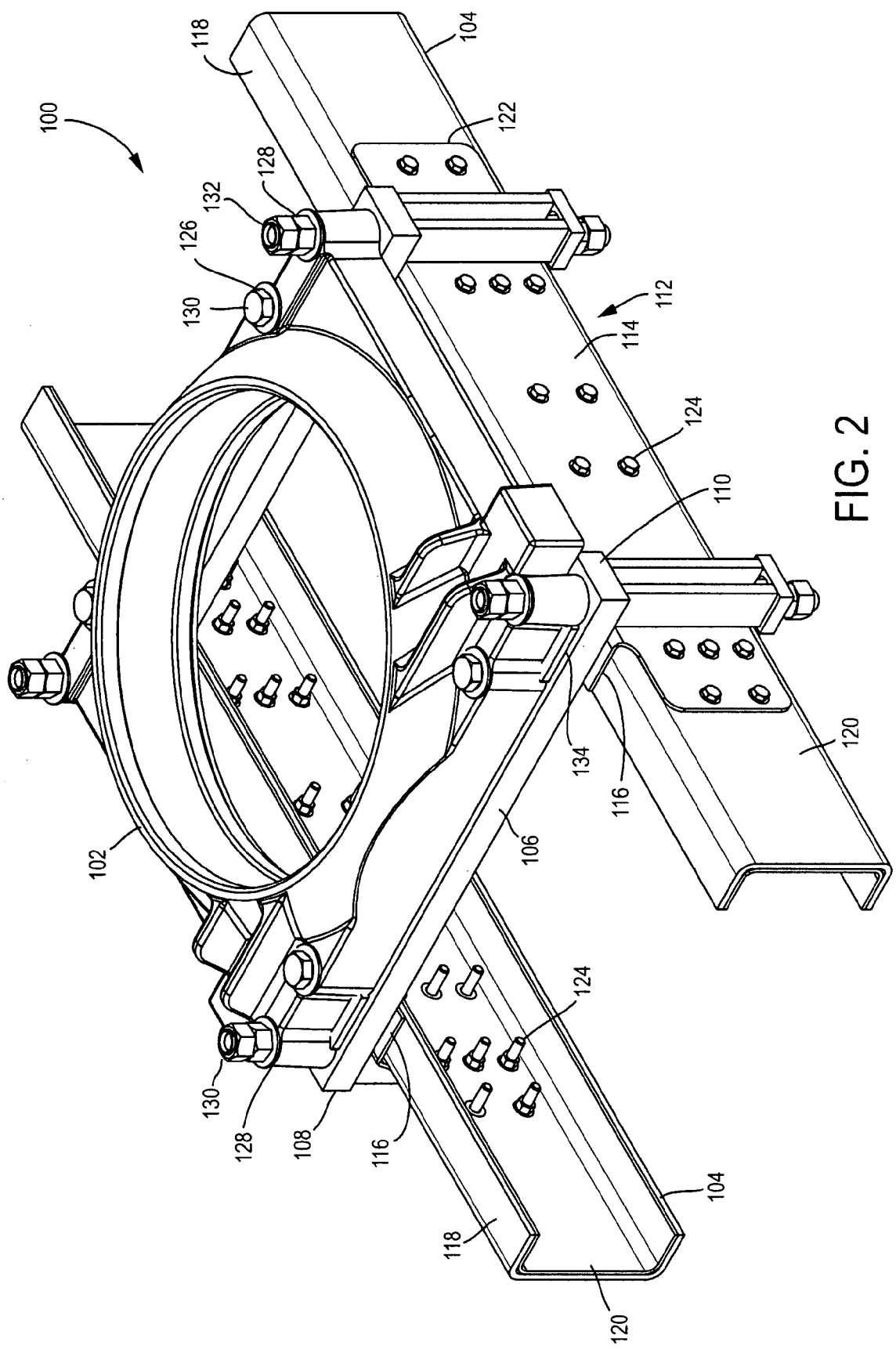
FIG. 2 is an isometric view of an exemplary embodiment of a crane mounting system in FIG. 1 coupled to a vehicle support structure.
Figure 3:
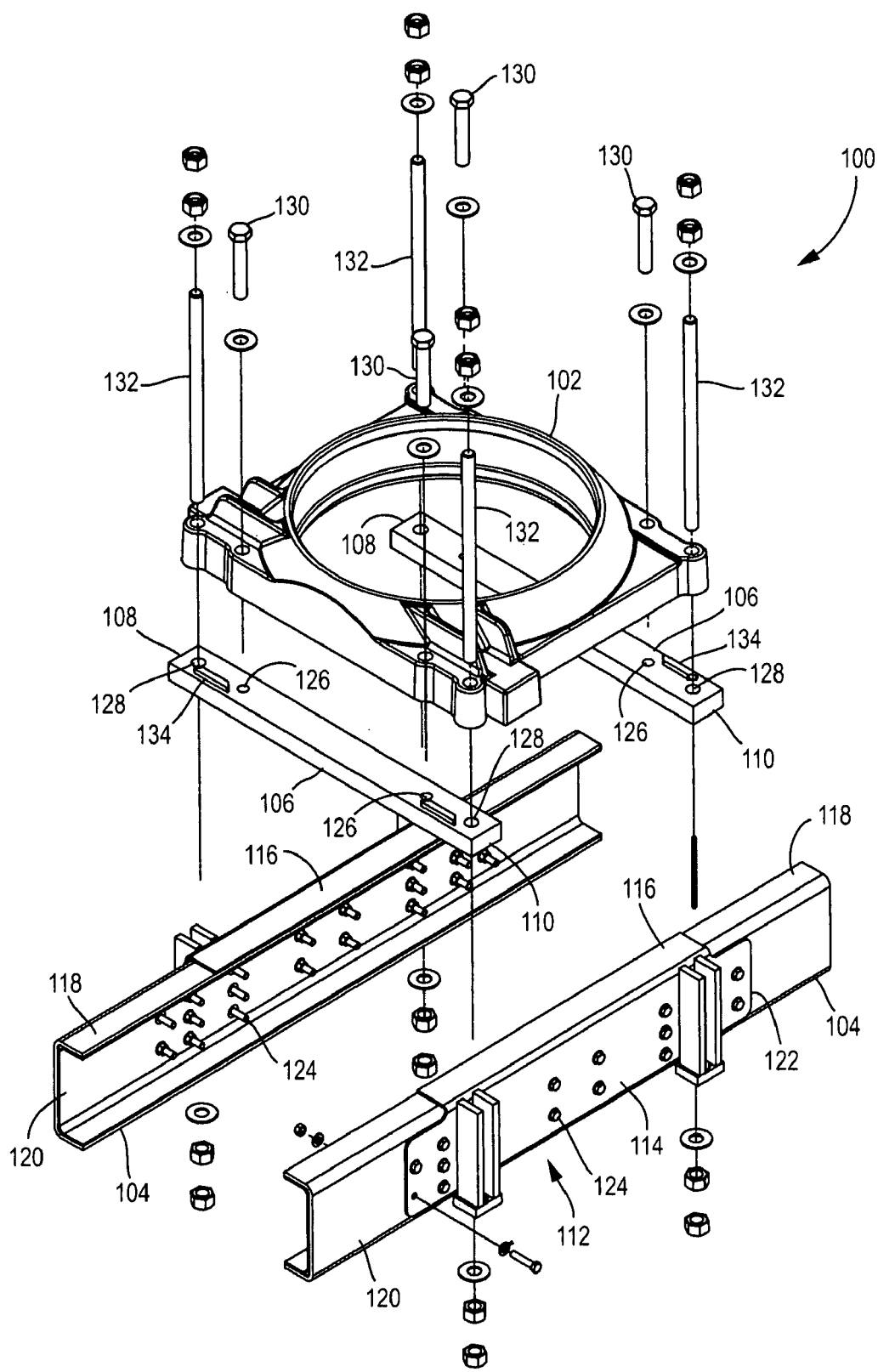
FIG. 3 is an exploded view of the crane mounting system in FIG. 2.

Referring especially to FIGS. 2 and 3, a crane mounting system 100 is shown according to one exemplary embodiment. The crane mounting system 100 is to be used, preferably, for mounting an articulated crane 10 onto a truck frame 6. The crane mounting system 100 includes a mounting platform for a crane suitably adapted for being rotatably mounted onto the mounting platform. The crane includes a base member 102. The mounting platform includes a first and second rail member 104, which are opposed to each other, and, preferably, substantially parallel to each other. As will be appreciated by those skilled in the art, the first and second rail members 104 are suitably made of, for example and without limitation, high strength low alloy steel. A skilled artisan will recognize that in a preferred embodiment, the first and the second rail members 104 are suitably integrated into a mobile truck frame 6, thus being integrated parts of a mobile truck frame 6. The mounting platform 100 also includes a first and second transverse mounting bar 106, each including a first end 108 and a second end 110. Those skilled in the art will appreciate, that the first and second transverse mounting bars 106 are capable of being implemented, for example and without limitation from high strength low alloy steel.

The first and second rail members 104 are adapted for receiving and engaging respective ends 108, 110 of the transverse mounting bars 106. As it will be appreciated by a skilled artisan, the transverse mounting bars 106 are suitably spaced apart at a predetermined distance from each other, the distance being defined by the dimensions of the base member 102, and are, preferably, parallel to each other. The transverse mounting bars 106 are adapted for receiving and engaging the crane base member 102.

Also included in the mounting platform are two wear plates that are designed as shear plates 112. As will be recognized by a skilled artisan, the shear plates 112 are preferably made of high strength low alloy steel. The shear plates 112 each include a substantially L-shape profile, i.e., include a first part 114 and a second part 116. The second part 116 of each shear plate 112 is substantially orthogonal to the first part 114. The first and second rail members 104 further include a top portion 118 and an exterior side portion 120. The first part 114 of each shear plate 112 is fixedly attached to the exterior side portion 120 of a respective rail member 104. As will be understood by those skilled in the art, the first part of the shear plate 114 is suitably attached by weldment 122 to the exterior side portion 120 of the respective rail member 104 and/or bolted to it using bolts 124.

In the embodiment shown in FIGS. 1-3, the transverse mounting bars 106 each further define two interior openings 126 and two exterior openings 128. The exterior openings 128 are disposed proximate each of the first and second ends 108, 110 of the transverse mounting bars 104. The interior openings 126 are defined in each of the mounting bars 106 at a predetermined distance from the exterior openings 128. A skilled artisan will recognize that the interior openings 126 in the transverse mounting bars 106 are adapted to receive a corresponding fastener 130 extending therethrough to secure the crane base member 102 to the two transverse mounting bars 106. The interior openings 126 in the first and second transverse mounting bars 106 are suitably threaded. As will be appreciated by one skilled in the art, with the interior openings 126 tapped, interference issues stemming from the existing cross members of the chassis frame, brake components, etc. are eliminated. the exterior openings 128 are drilled through to accept long tie down mounting studs 132 that extend across a corresponding exterior side portion 120 of the first and second rail members 104 to secure the first and second transverse mounting bars 106 to the first and the second rail members 104. The latter suitably relieves the bending stresses at the nut/thread point of the tie down fasteners 132 by eliminating alignment requirements, necessary in a conventional clamp mount.

The present design of the crane mounting system provides a stronger connection while increasing the second modulus of the mounting platform, where it is needed the most, and still eliminating crushing of the frame rails 104 due to possible improper tightening of the nuts, like in a clamp mount style. The "L" shaped profile of the shear plate 112 acts as a wear plate/surface as the crane base 102 sits on the transverse bars 106, that in turn nest on the shear plate 112 rather than directly on the chassis frame rail 104.

In addition, stop blocks 134 are fixedly attached at corresponding ends 108, 110 of the transverse mounting bars 106 to avoid any crane shifting. The stop blocks 134 are attached to a top surface of a corresponding transverse mounting bar 106, preferably, between a corresponding exterior mounting stud 132 and interior fastener 130. A skilled artisan will recognize that the stop blocks 134 are capable of being, for example, welded to the top surface of a corresponding transverse mounting bar 106.

Figure 4:
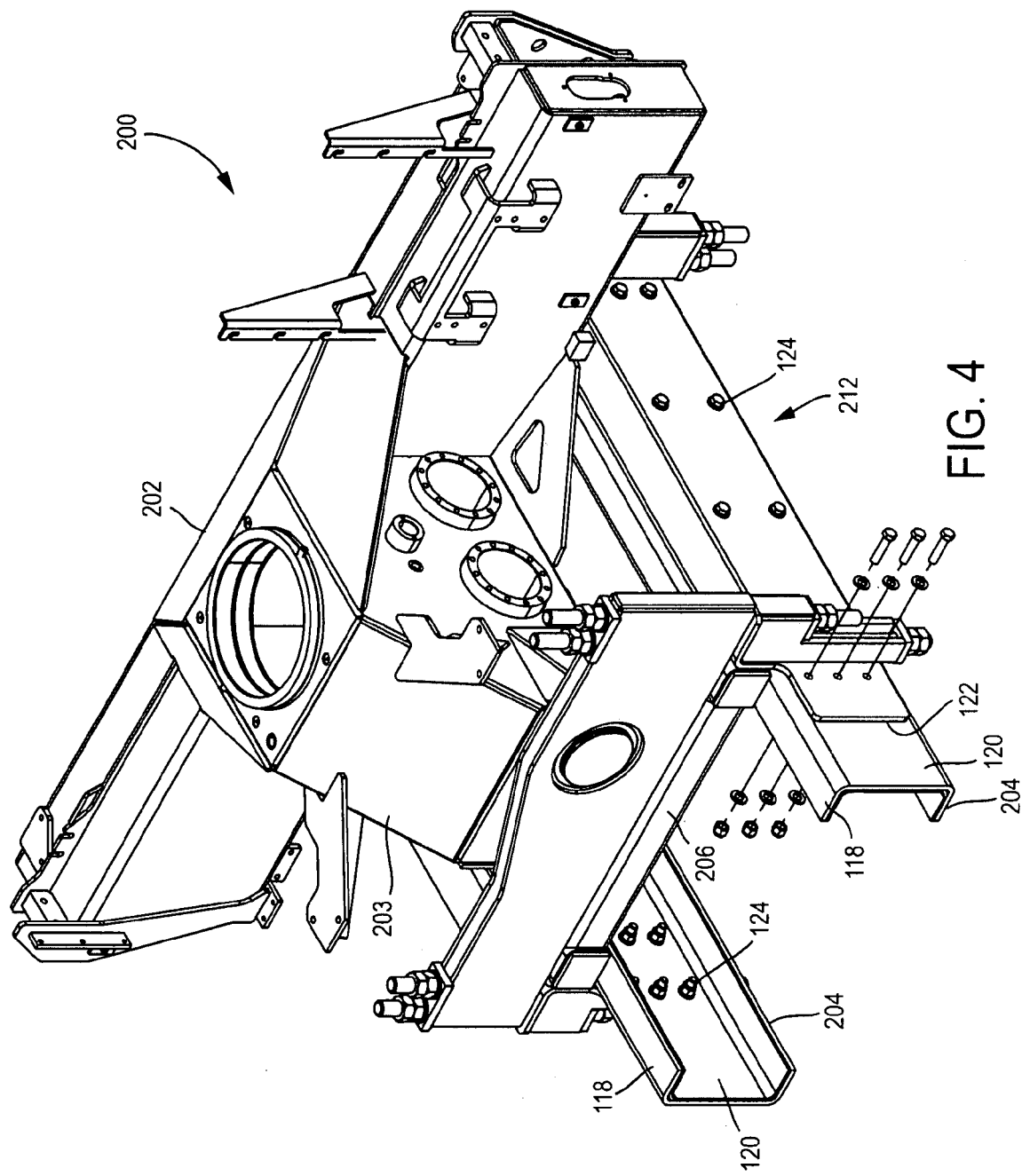
FIG. 4 is an isometric view of a crane mounting system according to another exemplary embodiment.

Referring now to FIG. 4, a crane mounting system 200 is shown according to another exemplary embodiment. The crane mounting system 200 is similar to the crane mounting system 100 shown in FIGS. 1-3. The base member 202 is configured with an extended housing 203 to raise the crane above the first and second rail members 204 which are opposed to each other, and, preferably, substantially parallel to each other. A first and second transverse mounting bar 206, and two wear plates that are configured as shear plates 212 and functions as described above are coupled to the housing 203.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

The foregoing description of a preferred embodiment of a shear plate mounting system has been presented for purposes of illustration and description. It is not intended to be exhaustive or limited to the precise form disclosed. Obvious modifications or variations are possible in light of the above teachings. The embodiment was chosen and described to provide the best illustration of the principles and practical application to thereby enable one of ordinary skill in the art to use the shear plate mounting system in various embodiments and with various modifications as are suited to the particular use contemplated.

What is claimed is:

1. A shear plate mounting system for mounting a crane, including a base member, to a vehicle support structure, with the vehicle support structure including two frame members with each frame member including a top portion and an exterior side portion, the shear plate mounting system comprising:

a pair of shear plates, with each shear plate coupled to one of the frame members and comprising a first part that is fixedly coupled directly to the exterior side portion of the frame member and a second part that is fixedly coupled directly to the top portion of the frame member;

a pair of transverse mounting bars mounted directly atop the top portion of each shear plate and coupled to each frame member, the mounting bars positioned a spaced parallel distance from each other; and a plurality of fasteners configured to engage and secure the base member to each transverse mounting bar, wherein the plurality of fasteners comprise a mounting stud fastener positioned adjacent the exterior side portion of each frame member and a bolt fastener positioned proximate an interior side portion of each frame member, and wherein each transverse mounting bar defines at least two openings proximate each end of each bar, with one opening configured to receive the mounting stud fastener and another opening configured to receive the bolt fastener.

2. The shear plate mounting system of claim 1, wherein each shear plate is configured to increase the section modulus of each frame member.

3. The shear plate mounting system of claim 1, wherein each shear plate is a one-piece member and the first and second parts are orthogonal to each other.

4. The shear plate mounting system of claim 1, wherein the shear plate is welded to the frame member.

5. The shear plate mounting system of claim 1, including a stop block coupled to each transverse mounting bar and positioned between the opening configured to receive the stud fastener and the opening configured to receive the bolt fastener.

6. A vehicle comprising:

a vehicle support structure, including two frame members, with each frame member including a top portion and an exterior side portion;

an engine coupled to the support frame;

a plurality of ground support members coupled to the vehicle support structure, with at least two ground support members coupled to the engine and at least two ground support members steerable; and a crane having a base member coupled to the support structure with a shear plate mounting system comprising:

a pair of shear plates, with each shear plate coupled to one of the frame members to increase the section modulus of each frame member, each shear plate comprises a first part that is fixedly coupled directly to the exterior side portion of the frame member and a second part that is fixedly coupled directly to the top portion of the frame member;

a pair of transverse mounting bars supported directly on top of the top portion of each the shear plate and coupled to each frame member, the transverse mounting bars being positioned a spaced parallel distance from each other; and a plurality of fasteners configured to engage and secure the base member to each mounting bar, wherein the plurality of fasteners comprise a mounting stud fastener positioned adjacent the exterior side portion of each frame member and a bolt fastener positioned proximate an interior side portion of each frame member, and wherein each transverse mounting bar defines at least two openings proximate each end of each bar, with one opening configured to receive the mounting stud fastener and another opening configured to receive the bolt fastener.

7. The vehicle of claim 6, wherein each shear plate is a one-piece member and the first and second parts are orthogonal to each other.

8. The vehicle of claim 6, wherein the shear plate is welded to the frame member.

9. The vehicle of claim 6, including a stop block coupled to each transverse mounting bar and positioned between the opening configured to receive the stud fastener and the opening configured to receive the bolt fastener.

10. The vehicle of claim 6, wherein the ground support members are wheels.

11. The vehicle of claim 6, wherein the vehicle is a truck.

* * * * *